*W. Stephens.*
*Oscillating Steam Engine.*
Nº 14,580. Patented Apr. 1, 1856.
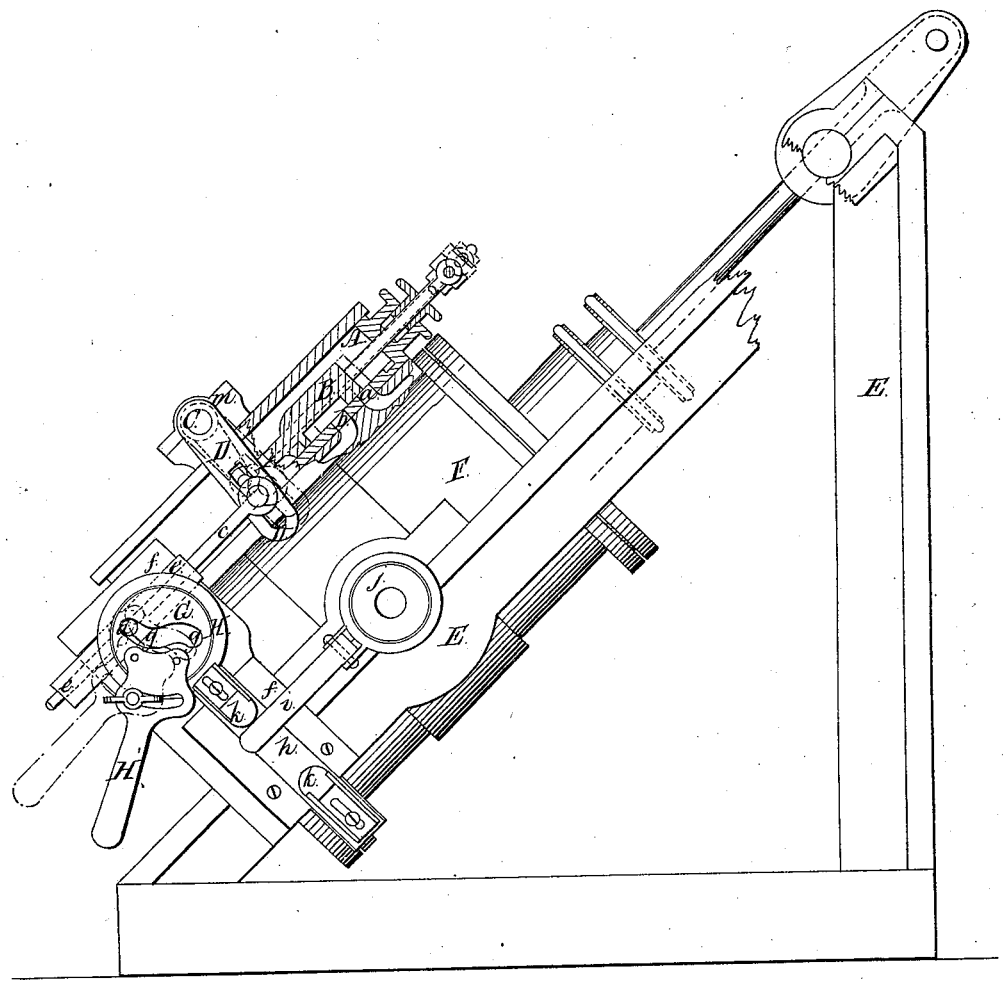

UNITED STATES PATENT OFFICE.

WILLIAM STEPHENS, OF PITTSTON, PENNSYLVANIA.

VALVE-GEAR OF OSCILLATING ENGINES.

Specification of Letters Patent No. 14,580, dated April 1, 1856.

*To all whom it may concern:*

Be it known that I, WILLIAM STEPHENS, of Pittston, in the county of Luzerne and State of Pennsylvania, have invented a new and useful Improvement in Valve-Gear for Oscillating Engines; and I do hereby declare that the following is a full, clear, and exact description of the same, reference being had to the accompanying drawing, forming part of this specification, which represents a side view of an oscillating engine with my improved valve-gear applied, the steam-chest being shown partly in section to illustrate the operation of the valve.

The object of my invention is to adjust the "lead" of the valve and to give it more or less "lead," as may be desired.

The valve gear represented with the exception of the device for varying the "lead" of the valve is substantially like that used in many other oscillating engines.

A, is the steam chest.

B, represents the upper one of two short slide-valves, and $a$, is the induction port and $b$ the eduction port corresponding with the valve B.

C, is the rock-shaft from which the valves derive motion, working in bearings $m$, attached to the steam cylinder F, in the usual way.

D, is the arm through which the rockshaft derives its rocking motion to move the valve, said rocking motion being produced by the oscillation of the cylinder while the movement of the arm D, is confined by its connection, through a rod $c$, with a pin $d$. This pin $d$, is attached to a slide $e$, fitted to a stationary guide plate $f$, attached to the main frame E, of the engine, which confines its motion to a line parallel with the central position of the engine cylinder F. The said pin $d$, is also fitted to a slot $g$, in a slide $h$, which is fitted to the stationary guide plate $f$, in such a way as to slide at right angles to the central position of the engine cylinder F. The slide $h$, receives motion from a vibrating tappet $i$, attached to one of the cylinder trunnions $j$, acting upon two adjustable projections $k$, $k$, on its face. The movement of the slide $h$, is intended through the agency of a curve in the slot $g$, to give the pin $d$, during a certain portion of the stroke of the engine, a movement, which causes it during such portion of the stroke to preserve an unchanged relation to the rockshaft C, by which means the movement of the valves is suspended after they have been caused to open their respective induction ports by such portion of the oscillation of the cylinder as takes place while the slide $h$, is stationary and the pin $d$ is stationary near one or the other end of the slot. As far as I have thus described the valve motion, there is nothing essentially new but there has been no provision described for varying the lead of the valve, which, with the valve gear constructed in the common way must be either without lead or have a certain fixed amount of lead.

To vary the lead of the valve, instead of making the slot $g$, in the slide $h$, itself, I make it in a circular plate A which I fit so as to be capable of turning in a circular frame H which forms a portion of the slide $h$, or else is rigidly attached thereto, and is provided a set screw $n$, to secure the said circular plate G to the frame H, or slide $h$, in a rigid condition during the operation of the engine. By turning or adjusting the plate, by means of a handle H', with which it is provided for the purpose, so as to bring the ends of the slot $g$, nearer in line with the slot $h$, the lead is diminished and by turning it to bring the ends more out of line with the said slide, the lead is increased. This is illustrated in the drawing where the slotted plate G, is shown in two positions, one in black outline and the other in red, the former showing the adjustment to give the valve a maximum of lead and the latter to give it no lead at all. The engine being shown on the center and the two positions of the valve at the time, under the two conditions of the slot $g$, being represented in colors to correspond with the positions of the plate G. When the crank is on the other center the pin $d$, is at the opposite end of the slot and the position of the lower valve which is not shown will be the same relatively to its ports as is now the position of the upper valve, the said relation being changed in the same way by the change of position of the slot $g$. By adjusting the plate G, between the two positions shown, the lead may be set as desired.

What I claim as my invention and desire to secure by Letters Patent, is,

The within described arrangement of the slotted plate G, in the slide $h$, or its equivalent, for the purpose of adjusting and varying the lead of the valve, substantially as herein set forth.

WILLIAM STEPHENS.

Witnesses:
G. A. FREEMAN,
JESSE WILLIAMS.